United States Patent [19]
Kuwahara

[11] Patent Number: 5,390,008
[45] Date of Patent: Feb. 14, 1995

[54] SCANNING APPARATUS
[75] Inventor: Tesshu Kuwahara, Kawaguchi, Japan
[73] Assignee: Kabushiki Kaisha Toshiba, Kawasaki, Japan
[21] Appl. No.: 162,306
[22] Filed: Dec. 6, 1993
[30] Foreign Application Priority Data
  Jan. 28, 1993 [JP] Japan .................. 5-012736
[51] Int. Cl.⁶ .......................................... G03G 15/00
[52] U.S. Cl. ................................ 355/235; 358/497
[58] Field of Search ................. 355/233, 235, 236; 358/474, 494, 497

[56] References Cited
U.S. PATENT DOCUMENTS

| | | | |
|---|---|---|---|
| 5,097,290 | 3/1992 | Watanabe | 355/233 X |
| 5,191,377 | 3/1993 | Kagiura et al. | 355/235 |
| 5,241,345 | 8/1993 | Miyamoto et al. | 355/235 |

FOREIGN PATENT DOCUMENTS

| | | | |
|---|---|---|---|
| 0090664 | 6/1982 | Japan | 355/235 |
| 0157626 | 9/1984 | Japan | 355/235 |
| 5-2214 | 1/1993 | Japan . | |

Primary Examiner—Robert B. Beatty
Attorney, Agent, or Firm—Foley & Lardner

[57] ABSTRACT

An optical apparatus having an exposure/scanning unit, a pair of guide rails, and a pair of support shafts. The exposure/scanning unit moves to scan an original placed on an original table. The guide rails guide the exposure/scanning unit. The support shafts are connected to ends of the exposure/scanning unit which are spaced apart in a direction at right angles to a direction in which the exposure/scanning unit moves. The shafts extend in the direction in which the exposure/scanning unit moves, and each shaft has contact members at its ends. The contact members extend from the exposure/scanning unit, contacting the guide rails and supporting the exposure/scanning unit. The length S (mm) of the support shafts, a distance l (mm) between the center of gravity of the exposure/scanning unit and a point on the exposure/scanning unit where the exposure/scanning unit is driven by an endless belt, the acceleration a (mm/sec²) of the endless belt and the acceleration of gravity g (mm/sec²) satisfy the following relationship: $S \geq 4\, al/g$.

3 Claims, 6 Drawing Sheets

SCANNING APPARATUS

BACKGROUND OF THE INVENTION

1. Field of the Invention

The present invention relates to a scanning apparatus for use in, for example, electronic copiers, which is designed to optically scan an original.

2. Description of the Related Art

Of the electronic copiers hitherto known, some contain a scanning apparatus designed to optically scan an original, while moving relative to the original. To be more specific, the scanning apparatus applies light to the original. The light reflected from the original is guided to a photosensitive drum, forming thereon an image which is identical to the image formed on the original.

For example, the scanning apparatus disclosed in Jpn. Pat. Appln. KOKOKU Publication No. 5-2214 has a carriage base which can be moved by a carriage motor in a scanning direction, i.e., the direction in which the apparatus scans an original. Mounted on the carriage base are an exposure lamp, a reflector, a mirror, and a cover. The exposure lamp emits light. The reflector reflects the light to the original. The mirror receives the light reflected from the original and applies it in a predetermined direction. The exposure lamp, the reflector, the mirror, and the cover constitute an exposure/scanning unit.

A pair of sliding members are attached to the bottom of the carriage base. They extend parallel to the scanning direction and are spaced apart from each other in the direction at right angles to the scanning direction. The sliding members are placed in sliding contact with a pair of guide rails. Hence, the carriage base can move, slinging on the guide rails.

The distance between the sliding members is less than the width of the carriage base. The center of gravity of the exposure unit mounted on the carriage base is likely to be located outside the space between the sliding members. Inevitably, the exposure unit is unstable as it is moved in the scanning direction. The unit may jump and shake as it is accelerated or decelerated. As a consequence, there will be formed a blurred image on the photosensitive drum, and the unit will make noise when moved in the scanning direction.

The exposure unit can be made stable while being moved in the scanning direction, only if the width of the carriage base is increased so that the sliding members may be spaced apart for a longer distance. Then, the carriage base can have its center of gravity located in the space between the sliding members. However, the broader the carriage base, the heavier it is. The load torque of the carriage motor increases in proportion to the weight of the carriage base, rendering it more possible that the motor may malfunction. It is therefore difficult to use a broader carriage base.

SUMMARY OF THE INVENTION

The object of the present invention is to provide a scanning apparatus which is relatively light and which can yet be moved smoothly, without jumping or shaking, when it is accelerated or decelerated.

According to one aspect of the present invention, there is provided a scanning apparatus comprising:

an original table for supporting an original;
movable means to be moved along the original table in the first direction;
guiding means for slidably guiding the movable means, the guiding means has a flat surface;
supporting means supporting the movable means on the flat surface of the guiding means, wherein the supporting means having shafts and support members positioned at both ends of each of the shafts in a first direction, the shafts are positioned at both sides of the movable means in a second direction perpendicular to the first direction, and each of the shaft is elongated in a main-scanning direction and has a length greater than a width of the movable means in the first direction; and
sliding means for sliding the movable means in the first direction, with the supporting means mounted on the guiding means.

According to another aspect of the invention, there is provided a scanning apparatus comprising:

an original table for supporting an original;
movable means to be moved along the original table in the first direction;
guiding means for slidably guiding the movable means, the guiding means has a flat surface;
supporting means positioned at both sides of the movable means in a second direction perpendicular to the first direction, elongated in the first direction, and supporting the movable means on the guiding means;
endless belt means connected at a predetermined point to the movable means, for moving the movable means in the first direction; and
driving means for driving the endless belt means at a predetermined acceleration,
wherein a length S (mm) of the supporting means, measured in the first direction, a distance l (mm) between the center of gravity of the movable means and the predetermined point, measured in a direction of gravity, the predetermined acceleration a (mm/sec$^2$) of the endless belt means, and acceleration of gravity g (mm/sec$^2$) satisfy the following relationship:

$$S \geq 4al/g.$$

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

An embodiment of the invention will now be described, with reference to FIGS. 1 to 5.

Figure 1:
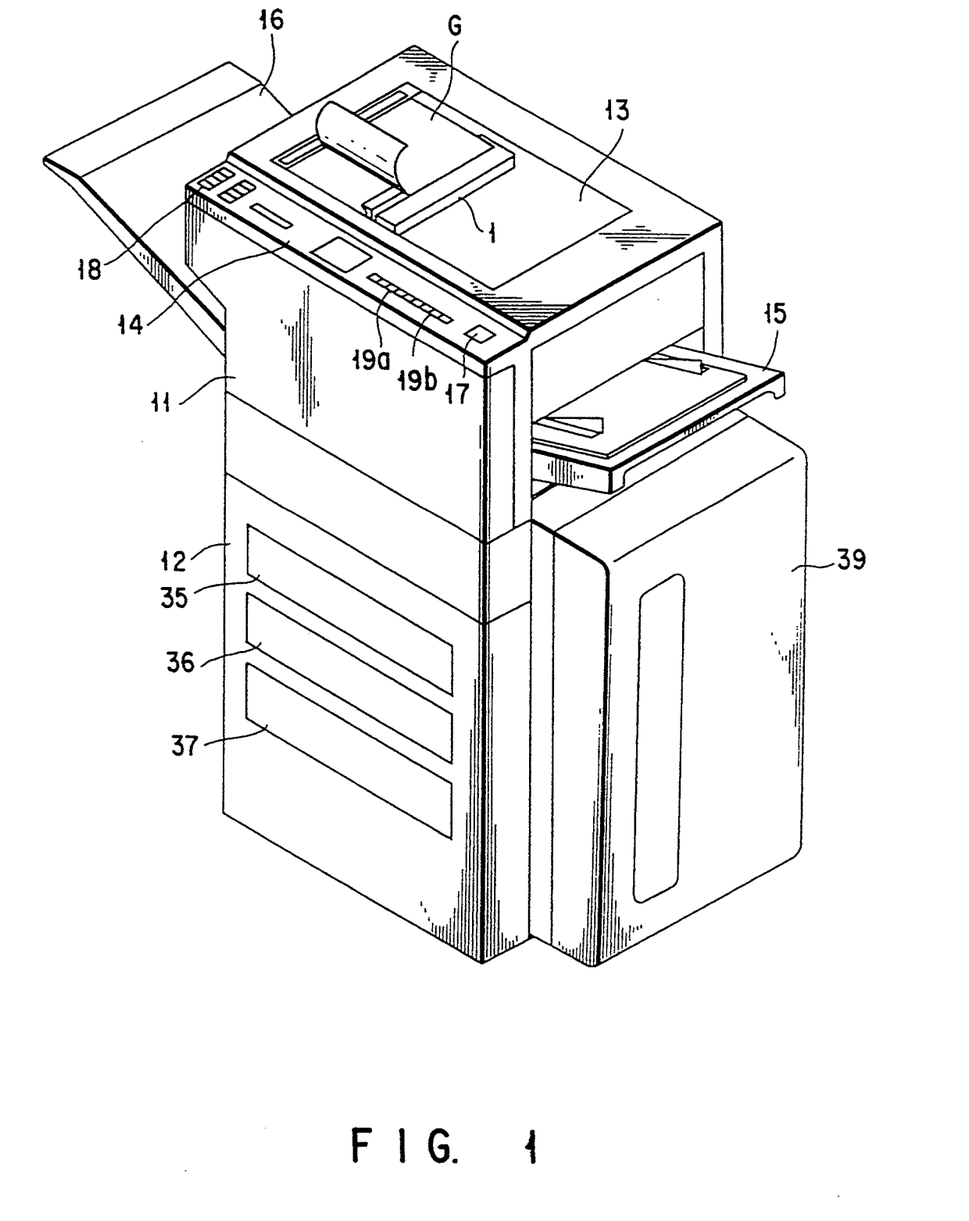
FIG. 1 is a perspective view showing an electronic copier which incorporates a scanning apparatus according to the present invention.

FIG. 1 shows an electronic copier comprising a housing 11 placed on a box-shaped mount 12. An original table 13 made of glass, and an operation panel 14 are mounted on the top of the housing 11. An original G is put on the original table 13. The panel 14 has various keys, among which are a copy number key 18, a paper-size designating key 19a, a magnification selecting key 19b, and a start button 17.

A manual paper feeding section 15 is connected to a first side of the housing 11. A copy tray 16 is attached to the second side of the housing 11 which is opposite to the first side. Three paper cassettes 35, 36 and 37 are inserted into the housing 11 from the front of the housing 11. A large-capacity paper storage 39 is connected to the first side of the housing 11 and located below the manual paper feeding section 15.

Figure 2:
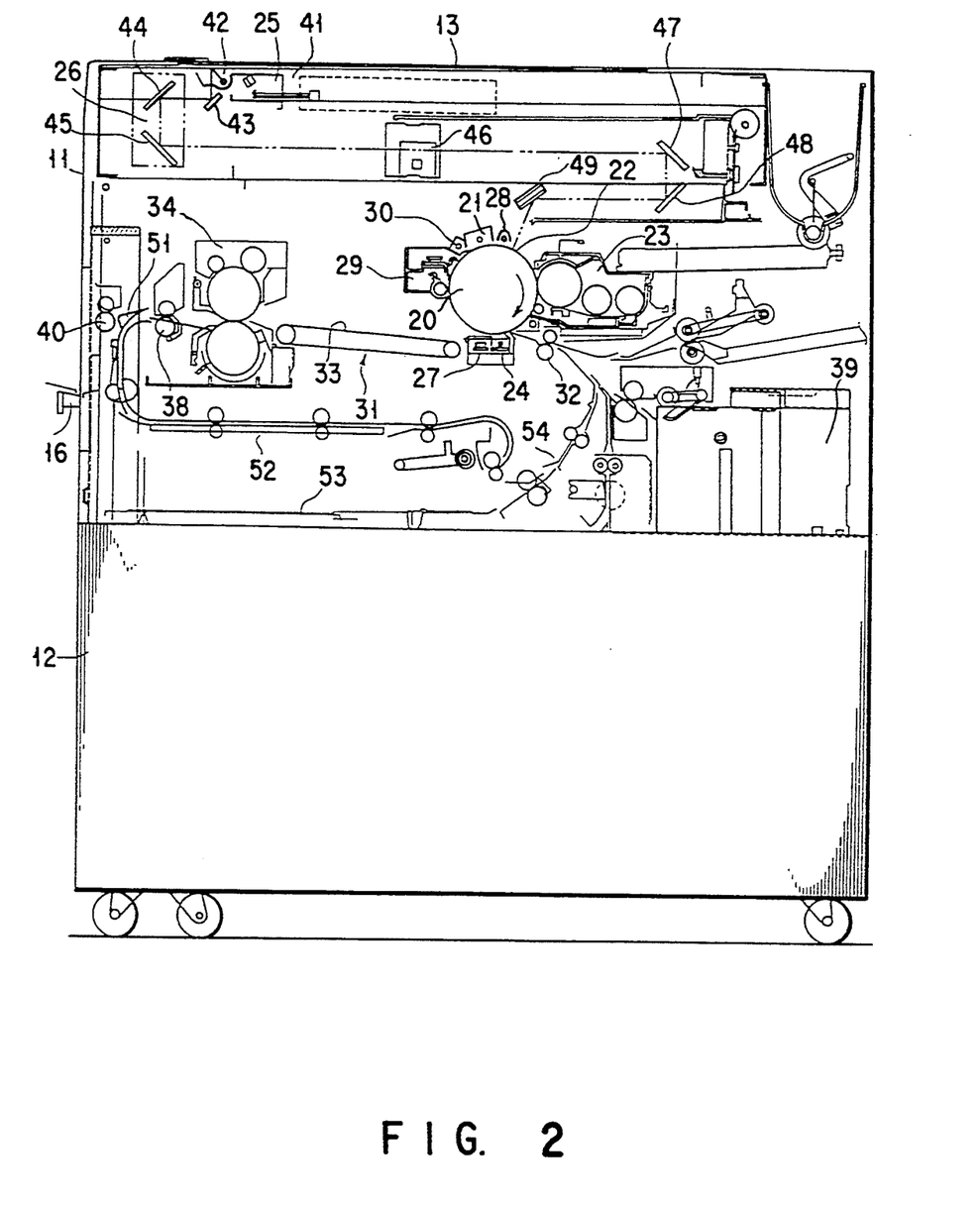
FIG. 2 is a partly sectional side view showing the internal structure of the electronic copier shown in FIG. 1.

FIG. 2 shows the internal structure of the electronic copier shown in FIG. 1. As shown in FIG. 2, a scanning apparatus 41 according to the invention is located within the upper portion of the housing 11. A photosensitive drum 20 is positioned below the scanning apparatus 41; it can rotate in the direction of the arrow. The scanning apparatus 41 comprises a first carriage 25, a second carriage 26, a lens block 46, and three mirrors 47, 48 and 49 for guiding light from the lens block to the photosensitive drum 20. The structure of the scanning apparatus 41 will be described later in detail. Arranged around the drum 20 in the rotating direction thereof are: a charger a discharging array 28, a developing unit 23, a transfer charger 24, a paper-peeling charger 27, a cleaning unit 29, and a discharger 30. The charger 21 is used for charging the surface of the drum 20 uniformly. The discharging array 28 is provided for removing residual charge from the surface 22 of the drum 20. The developing unit 23 is designed to convert a latent image formed on the drum surface into a toner image which is visible. The transfer charger 24 can transfer a toner image from the drum 20 onto a paper sheet. The paper-peeling charger 27 is provided for peeling a paper sheet from the drum 20. The cleaning unit 29 is designed to remove residual toner from the photosensitive drum 20. The discharger 30 is used to remove residual charge from the photosensitive drum 20.

A first paper sheet passage 31 extends horizontally within the housing 11. Arranged along the first sheet passage 31 are: a pair of register rollers 32, a conveyer belt 33, a fixing unit 34, a pair of copy feeding rollers 38, and a pair of copy ejecting rollers 40. The register rollers 32 is used to align every paper sheet reaching them, with respect to the drum 20. The conveyer belt 33 is provided to transport a paper sheet peeled from the drum 20 by the charger 27, to the fixing unit 34. The fixing unit 34 is designed to fix the toner image on the paper sheet. The copy feeding rollers 38 is used for feeding a paper sheet from the fixing unit 34 to the copy ejecting rollers 40. The rollers 40 are designed to eject the copied sheet from the housing 11 onto the copy tray 16.

A gate 51 is located between the copy feeding rollers 38, on the one hand, and the copy ejecting rollers 40, on the other. The gate 15 can rotate to guide a paper sheet to the copy ejecting rollers 40 or into a second sheet passage 52 which branches from the first sheet passage 31. The second sheet passage 52 extends first downwards and then horizontally; it guides the copied sheet into a sheet collecting section 53 located below the second sheet passage 51. The copied sheet can be fed from the sheet collecting section 53 through a third sheet passage 54 to the register rollers 32 so that an image may be copied on the image already copied on the paper sheet.

Figure 3:
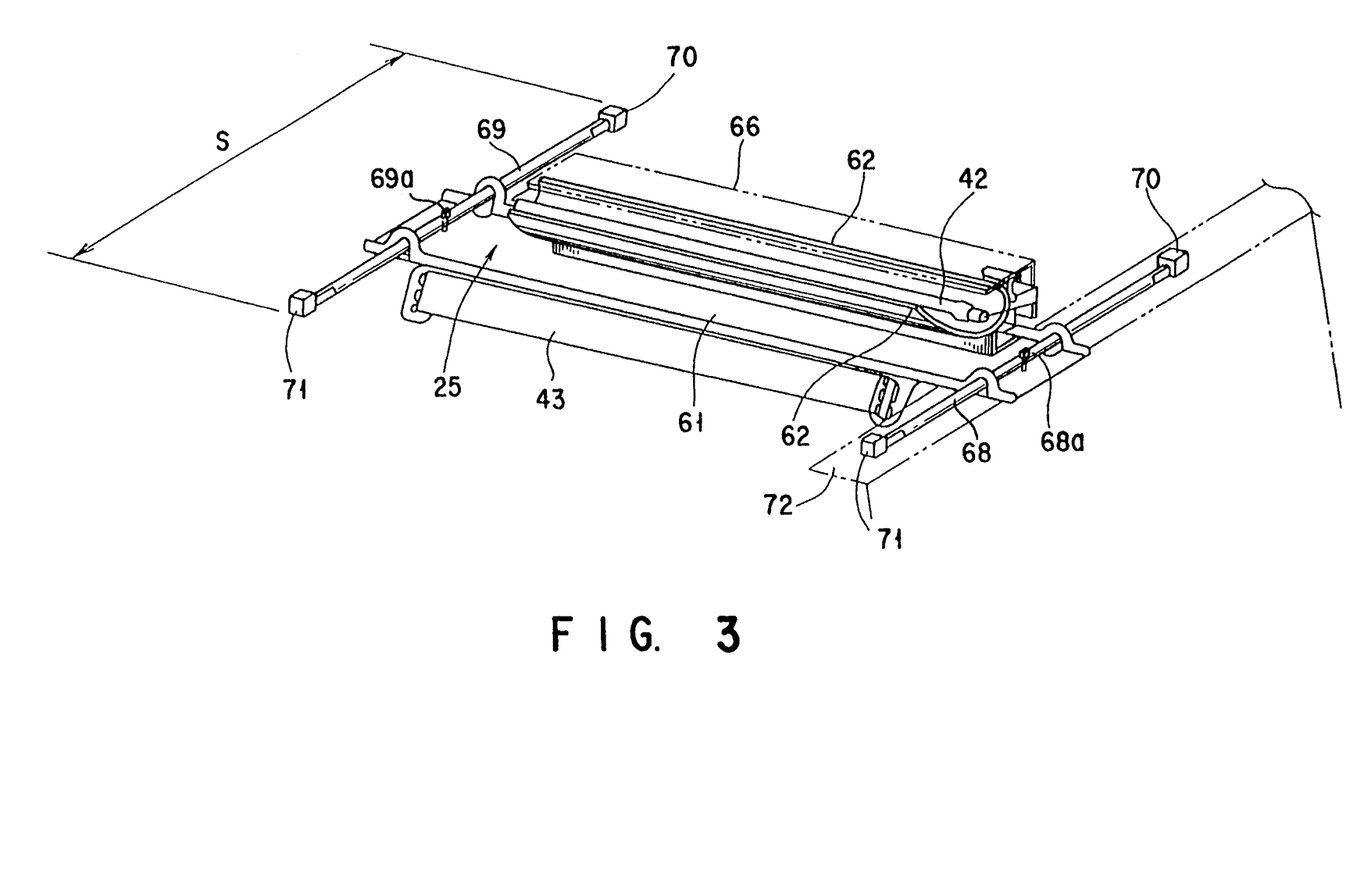
FIG. 3 is a perspective view illustrating the scanning apparatus.

The optical apparatus 41 will be described in detail, with reference to FIGS. 3, 4, and 5.

Figure 4:
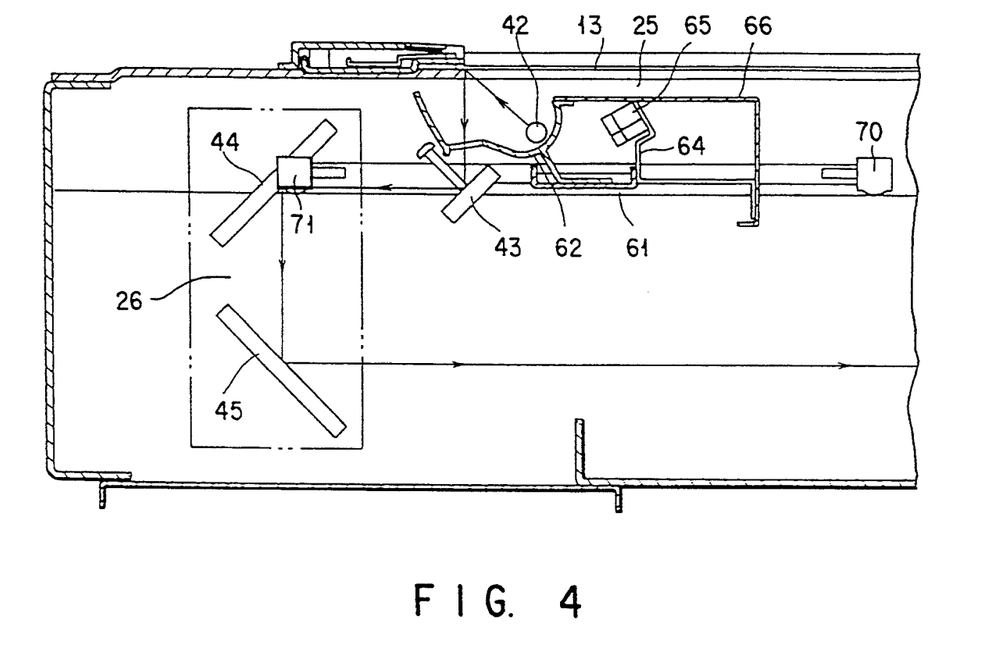
FIG. 4 is a sectional side view showing the scanning apparatus illustrated in FIG. 2.

As is shown in FIG. 4, the apparatus 41 has two carriages 25 and 26 which can move back and forth along the original table 13 mounted on the top of the housing 11. Mounted on the first carriage 25 are an exposure lamp 42 and a first mirror 43. Mounted on the second carriage 26 are a second mirror 44 and a third mirror 45. The lamp 42 can apply light to an original, and the first mirror 43 is positioned to guide the light reflected from the original, to the second mirror 44. The second mirror 44 is positioned to guide light to the third mirror 45, which applies the light along a predetermined path. The first carriage 25, the exposure lamp 42, and the first mirror 43 constitute an exposure/scanning unit. As shown in FIG. 2, a lens 46, a fourth mirror 47, a fifth mirror 48, and a sixth mirror 49 are arranged in the path along which the light is applied from the third mirror 45.

As shown in FIG. 4, the first carriage 25 is mounted on a carriage base 61. A reflector 62 is attached to the carriage base 61, and so is the exposure lamp 42. An electric unit 65 is fastened to a support 64, which is coupled to the carriage base 61. The electric unit 65 is protected by a cover 66. As shown in FIG. 5, a light adjusting member 67 is secured to the top of the cover 66. The member 67 can be displaced, thereby to adjust the amount of light applied from the exposure lamp 42 to the original placed on the original table 13.

The carriage base 61 has support shafts 68 69 are fastened to its ends, respectively. The shafts 68 and 69 are parallel and spaced apart from each other in a direction at right angles to the moving direction of the base 61. The shafts 68 and 69 have a length greater than the width of the exposure/scanning unit constituted by the first carriage 25, the exposure lamp 42, the first mirror 43 and the reflector 62. Hence, the end portions of each support shaft extends from the first carriage 25. Both shafts 68 and 69 are fastened at their middle portions to the carriage base 61 by fasteners 68a and 69a.

Sliding members 70 and 71, both made of synthetic resin, are removably attached to the ends of each support shaft 68 and 69, respectively. The sliding members 70 and 71 have a semi-spherical lowers surface each. Hence, the lower surface of the sliding member 70 is in point contact with the flat top 72a of a guide rail 72, and the lower surface of the sliding member 71 is in point contact with the flat top 73a of a guide rail 73. The pair of guide rails 72 and 73 extend horizontally, parallel to each other in the moving direction of the carriage base 61. Hence, the carriage base 61 can be moved back and forth, along the guide rails 72 and 73. The flat top 72a of the guide rail 72 and the flat top 73a of the guide rail 73 are made smooth, so that the friction between the rails 72 and 73, on the one hand, and the sliding members 70 and 71, on the other, is small.

Figure 5:
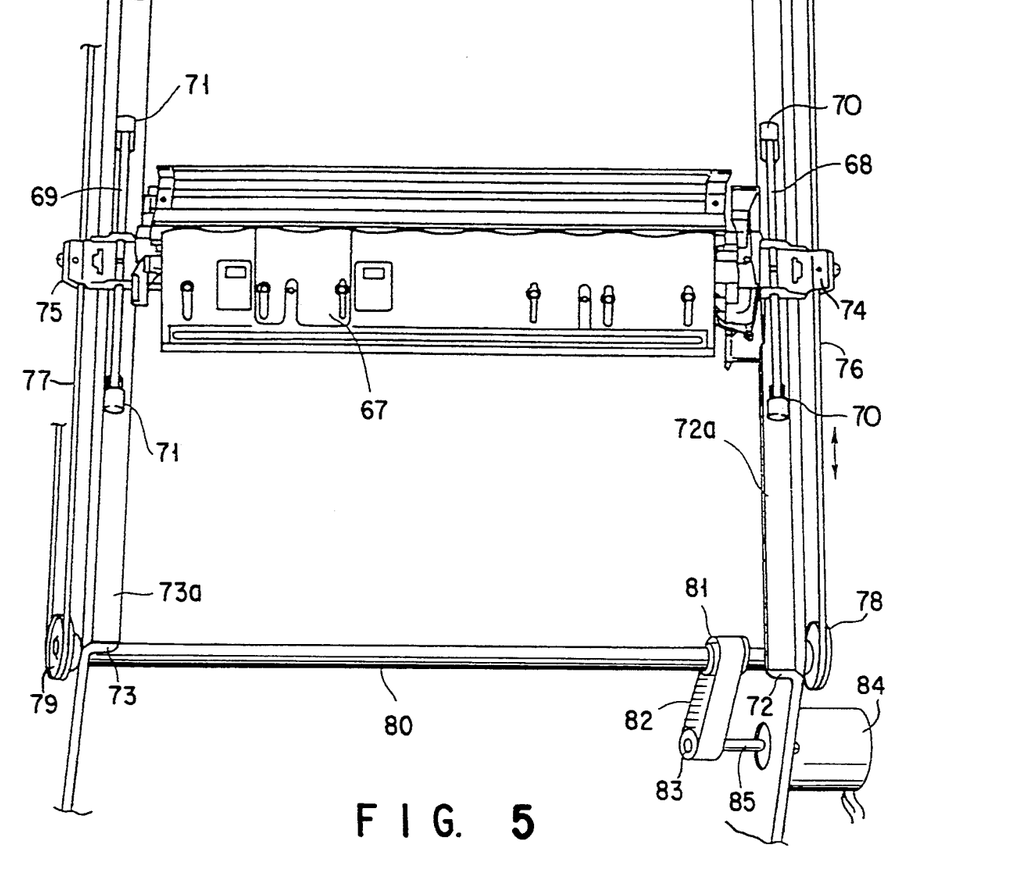
FIG. 5 is a perspective view illustrating a system for driving the scanning apparatus.

As shown in FIG. 5, fasteners 74 and 75 fasten drive belts 76 and 77 to the ends of the carriage base 61, respectively. The belts 76 and 77 are wrapped around pulleys 78 and 79 fixedly mounted on a shaft 80. A pulley 81 is fixedly mounted on the shaft 80, and a pulley 83 is connected to the shaft 85 of an electric motor 84. A drive belt 82 is wound around the pulleys 81 and 83.

It will be explained how the scanning apparatus 41 operates in the electronic copier. To make copies of an original G, an operator places the original G on the original table 13 and pushes the start button 17 of the operation panel 14. The exposure lamp 42 is thereby turned on, emitting light, and both carriages 25 and 26 are thereby moved along the original table 13. At this time, the first carriage 25 is driven by the belts 76 and 77. More specifically, a gear belt 82 transmits the rotation of the motor 84 to the shaft 80, whereby the pulleys 78 and 79 are rotated. As a result, the drive belts 76 and 77 are driven, and the first carriage 25 is driven, while the sliding members 70 and 71 attached to the support shaft 68 slide on the flat top 72a of the guide rail 72 and the sliding members 70 and 71 attached to the support shaft 69 is sliding on the flat top 73a of the guide rail 73.

Figure 6:
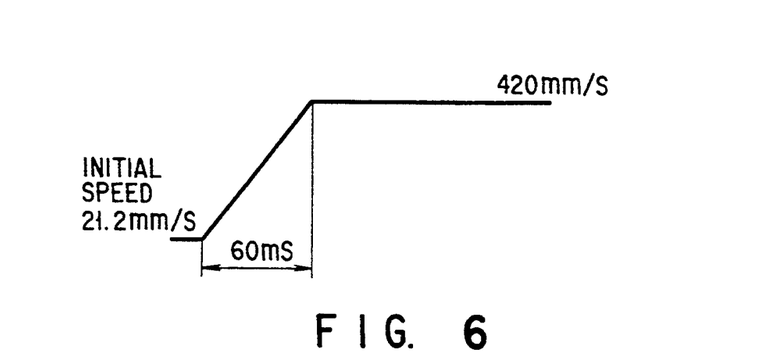
FIG. 6 is a diagram explaining how the scanning apparatus is accelerated, while moving in stability.
Figure 7:
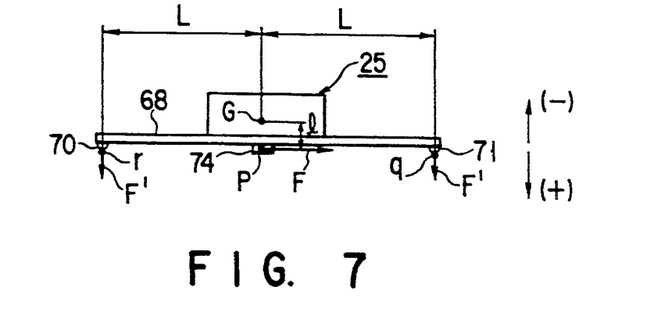
FIG. 7 is a diagram of the relationship of forces applied on the scanning apparatus shown in FIG. 2.

The first carriage 25 is accelerated from the initial speed of 21.2 mm/S to the desired speed 420 mm/S over 60 mS, as shown in FIG. 6. Thereafter, the first carriage 25 performs scanning at the speed of 420 mm/S. As shown in FIG. 5, the first carriage 25 is fastened to the drive belts 76 and 77 by means of the fasteners 75 and 74. Hence, when the belts 76 and 77 are driven, the first carriage 25 is moved back and forth. FIG. 7 illustrates the relationship among the gravity center G of the first carriage 25, point p at which the carriage 25 is fastened to the belts 76 and 77, and points q and r at which the sliding members 70 and 71 contact the guide rails 72 and 73. For the sake of simplicity, the first carriage 25 is shown in FIG. 7 as if it were rectangular. As shown in FIG. 7, gravity center G and point p are located at the midpoint with respect to the width of the first carriage 25. Force F', which acts at each of points q and r in the vertical direction, is given as follows, assuming that the shafts 68 and 69 of the carriage 25 have a length S of 2 L each:

$$F = mg/2$$

where m is the weight of the carriage 25 and g is the acceleration of gravity.

When the belts 76 and 77 are driven and the first carriage 25 is accelerated, a force F is applied at point p in the direction in which the carriage 25 is moving. F=ma, where a is the acceleration. At this time, a moment M acts on the carriage 25. M=lma, where l is the distance between the gravity center G and either point p. Also, a force F'' identified as follows acts at point q:

$$F' = F - M/L \qquad (1)$$

If force F'' is one acting upwards, or a negative force, the first carriage 25 will be moved up. In other words, if F''=F'−M/L<0, the first carriage 25 will jump when force F'' is a negative one. In order to prevent the carriage 25 form jumping at point p while it it being accelerated, it is necessary, in practice, to make force F'' have the following value:

$$F' = F - M/L \geqq 0$$

Obviously, first carriage 25 will not jump if the following condition is satisfied:

$$mg/2 - M/L \geqq 0 \qquad (2)$$

Thus:

$$M/L \geqq mg/2 \qquad (3)$$

Therefore:

$$lma \geqq mgL/2 \qquad (4)$$

Hence, it is possible to prevent the first carriage 25, which is being accelerated, from jumping if the shafts 68 and 69 has length S of:

$$S = 2L \geqq 4al/g \qquad (5)$$

As the first carriage 25 is driven, the original G is scanned with the light emitted from the exposure lamp 42. The light reflected from the original G is applied to the lens 46 by means of the mirrors 43, 44, and 45. The light is hence applied onto the surface of the photosensitive drum 20 by the mirrors 47, 48, and 49. A latent image identical to the original image is formed on the drum surface, which has been electrostatically changed by means of the charger 21. The latent image is converted into a toner image, i.e., a visible image, when the developing unit 23 applies toner onto the surface of the drum 20.

In the meantime, a paper sheet to the register rollers 32 is supplied from one of the cassettes 35, 36 and 37, or from the large-capacity paper storage 39. The rollers 32 align the paper sheet with respect to the photosensitive drum 20. The paper sheet is supplied to the image transfer section located between the drum 20 and the transfer charger 24. The transfer charger 24 transfers the toner image which is transferred from the drum 20 onto the paper sheet in the image transfer section. The paper-peeling charger 27 peels the paper sheet from the photosensitive drum 20. The paper sheet is transported by the conveyer belt 33 to the fixing unit 34. The unit 34 fixes the toner image on the paper sheet. The paper sheet is fed from the fixing unit 34 to the copy ejecting rollers 40. The rollers 40 eject the copied sheet from the housing 11 onto the copy tray 16.

In order to copy another image on the image already copied on the paper sheet, the gate 51 is rotated to guide a paper sheet into the second sheet passage 52 branching from the first sheet passage 31, not to the copy ejecting rollers 40.

As has been indicated, the sliding members 70 and 71 removably attached to the ends of the support shaft 68 are located outside the ends of the first carriage 25 which constitutes the exposure/scanning unit, jointly with the exposure lamp 42, the first mirror 43, the carriage base 61 and the reflector 62. So located are the sliding members 70 and 71 attached to the ends of the support shaft 69. Hence, the center of gravity of the mirror 43, that of the reflector 62, and that of the carriage base 61 exist well within a space between the sliding members 70 and 71. The first carriage 25 can therefore be stabilized even while moving in the scanning direction. Since the first carriage 25 does not vibrate while performing scanning, it will not adversely influence the imaging-forming process.

The length 2L (FIG. 7) of the support shafts 68 and 69 depends on the size of the reflector 62 and that of the cover 66. It is required, however, that the shafts 68 and 69 be so long that the centers of gravity of the components of the exposure/scanning unit (including the carriage 25) do not exist beyond the ends of the support shafts 68 and 69. Only if this requirement is satisfied, the first carriage 25 will neither shake nor jump while moving in the scanning direction. In other words, the first carriage 25 remains stable while it is moving in the scanning direction.

A scanning apparatus identical to the one shown in FIG. 2 was manufactured and was tested to determine how it would behave when accelerated. The results of the test were as is shown in FIG. 7. As can be understood from the figure, the first carriage 25 was accelerated from its initial speed of 21.2 mm/S to 420 mm/S for a period of 60 mS.

The guide rails 72 and 73 have been formed by bending the upper portions of two side walls located within the housing 11. The upper edges of the upper portion of either side wall is covered with an ultrahigh molecular polyethylene layer having a thickness of 0.65 mm, which has high abrasion resistance. Therefore, the friction between the sliding members 70 and 71 of the first carriage 25, on the one hand, and the upper edges (i.e., the flat tops 72a and 73b) of the rails 72 and 73, on the other hand, is small. Hence, wear of the sliding members 70 and 71 can be reduced to a minimum.

The sliding members 70 and 71 may be secured to the shafts 68 and 69 by means of either adhesive or welding. Alternatively, they may be set in frictional engagement with the shafts 68 and 69. Still Alternatively, claws may be formed integral with the shafts 68 and 69, connecting the members 70 and 71 to the shafts 68 and 69.

Figure 8:
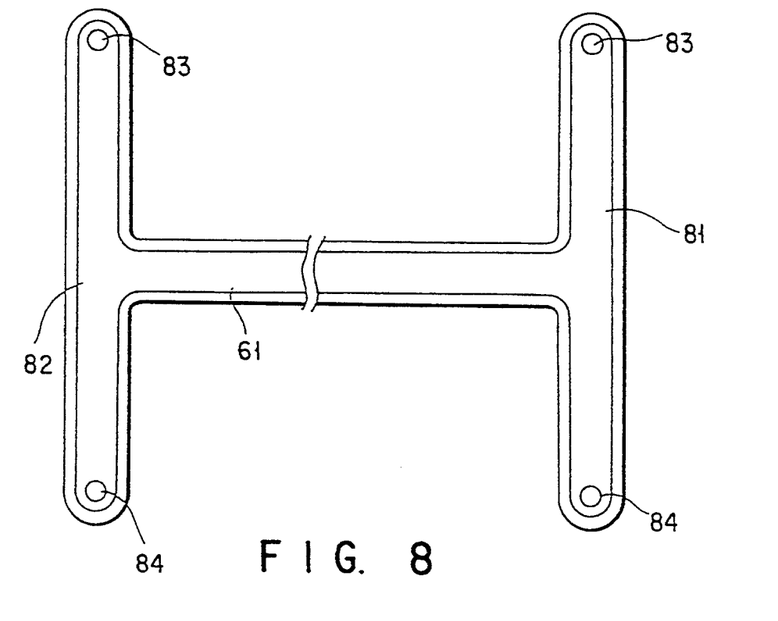
FIG. 8 is a plan view showing the carriage base of another scanning apparatus according to the present invention.
Figure 9:
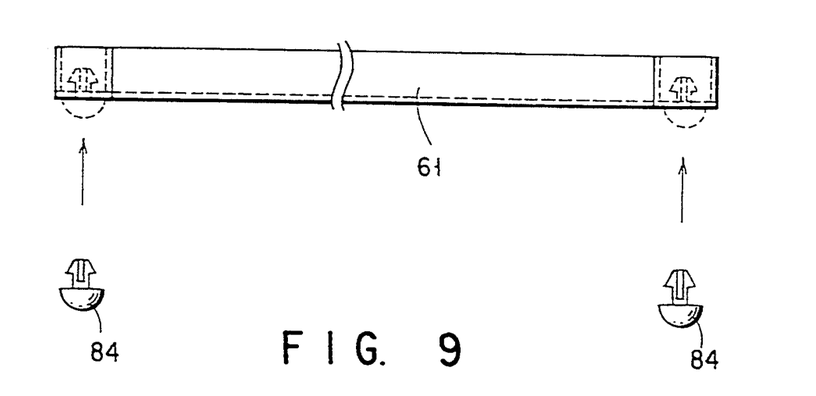
FIG. 9 is a side view showing the carriage base of FIG. 8.

In the embodiment described above, the shafts 68 and 69 support the first carriage 25. According to the invention, the carriage 25 may be supported by a carriage base of the type shown in FIGS. 8 and 9. This carriage base comprises a main part 61 and a pair to extensions 81 and 82. The extension 81 and 82 are formed integral with the ends of the part 61, respectively, and extend in the scanning direction in which the carriage 25 is moved. The extensions 81 and 82 perform the same function as the support shafts 68 and 69. Sliding members 83 and 84 are removably fastened to the ends of each extension, respectively. These members 83 and 84 are in point contact with the flat tops 72a and 73a of the guide rails 72 and 73. The sliding members 83 and 84 are removably attached to the main part 61. Thus, they can easily be replaced by new ones if they have been worn considerably. The first carriage 25 having the exposure lamp 42 and the mirror 43 is mounted on the main body 61 and located between the sliding members 83 and 84 connected to the ends of the extensions 81 and 82.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A scanning apparatus comprising:
   an original table for supporting an original;
   movable means to be moved along the original table in a first direction;
   guiding means for slidably guiding the movable means, said guiding means having a flat surface;
   supporting means having shafts and support members positioned at both sides of the movable means in a second direction perpendicular to the first direction, elongated in the first direction, and supporting said movable means on said guiding means;
   endless belt means connected at a predetermined point to said movable means, for moving said movable means in the first direction; and
   driving means for driving said endless belt means at a predetermined acceleration,
   wherein a length S (mm) of said supporting means, measured in the first direction, a distance l (mm) between the center of gravity of said movable means and the predetermined point, measured in a direction of gravity, the predetermined acceleration a (mm/sec$^2$) of said endless belt means, and acceleration of gravity g (mm/sec$^2$) satisfy the following relationship:

$S \geq 4al/g$.

2. The scanning apparatus according to claim 1, wherein the flat surface of said guiding means is smooth, and the support members of said supporting means have a semi-spherical projection each and are set in point contact with the flat surface of said guiding means.

3. The scanning apparatus according to claim 1, wherein each of said shafts protrude at both ends in the first direction from the ends of said movable means.

* * * * *